Nov. 26, 1957
H. C. TATE
2,814,313
MANUFACTURE OF PIPE
Filed Nov. 21, 1952
3 Sheets-Sheet 1
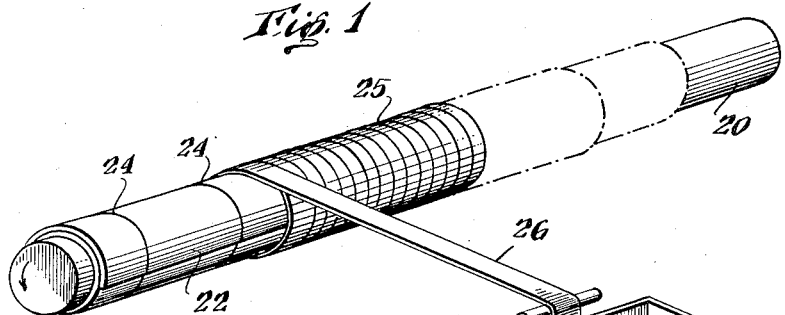
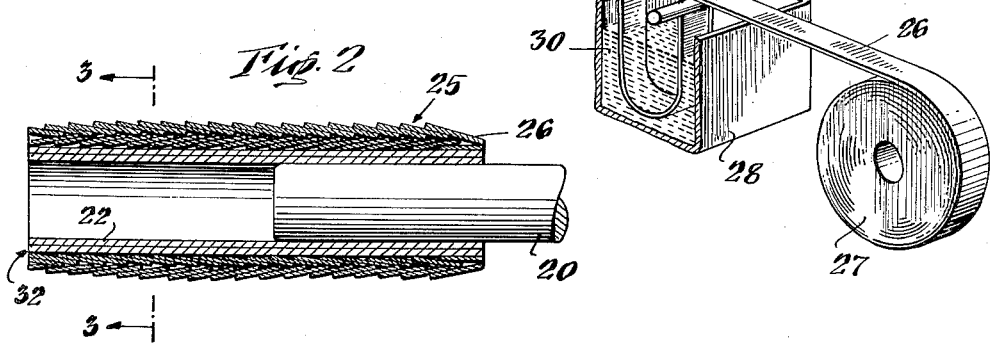
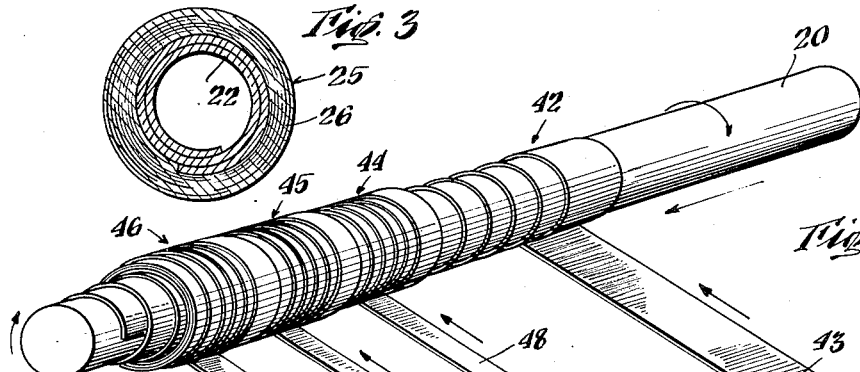
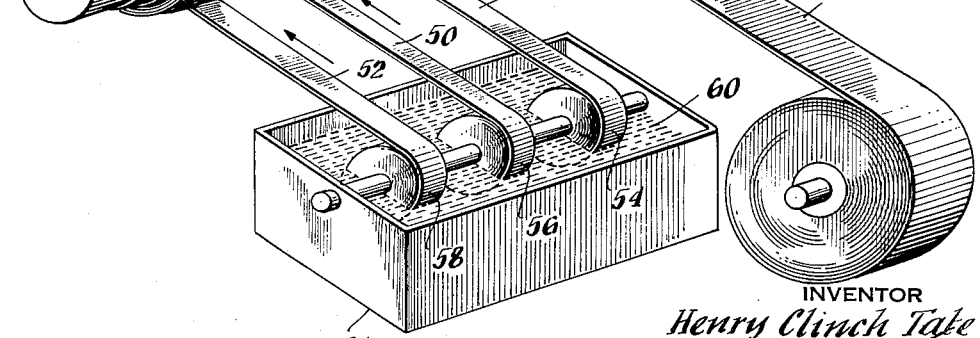
INVENTOR
Henry Clinch Tate
BY Robert A. Dunham
ATTORNEY

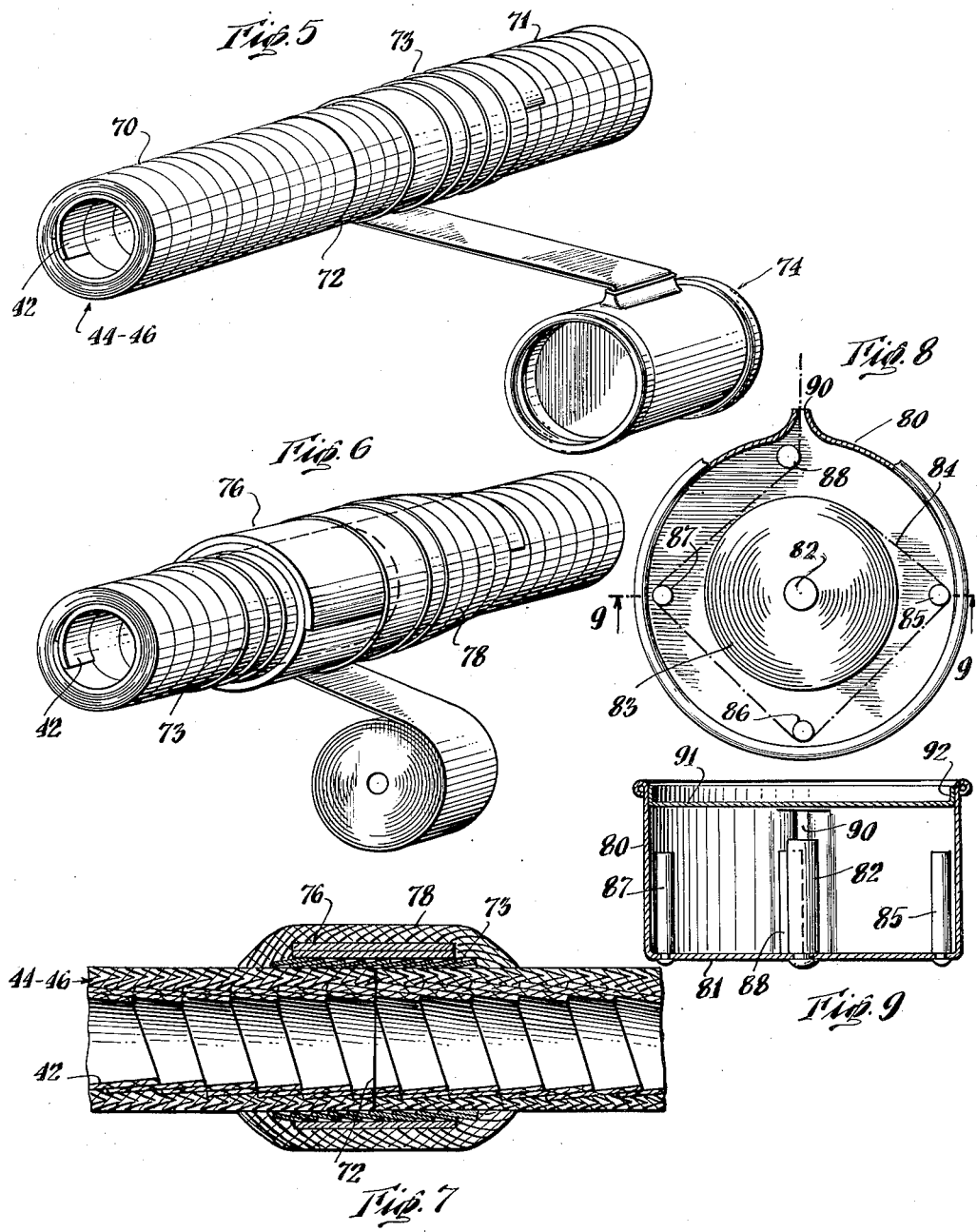

Nov. 26, 1957  H. C. TATE  2,814,313
MANUFACTURE OF PIPE
Filed Nov. 21, 1952  3 Sheets-Sheet 3

INVENTOR
Henry Clinch Tate
BY Robert A. Dunham
ATTORNEY

United States Patent Office 2,814,313
Patented Nov. 26, 1957

2,814,313

MANUFACTURE OF PIPE

Henry Clinch Tate, Westport, Conn.; John K. Holbrook, executor of said Henry Clinch Tate, deceased, assignor to Cordo Chemical Corporation, Norwalk, Conn., a corporation of Connecticut Application November 21, 1952, Serial No. 321,826

4 Claims. (Cl. 138—76)

This invention relates to the manufacture of pipe, by which is meant tubes, conduits, ducts and like tubular structures (of curved, rectangular or other shape in cross-section), usually elongated, for various purposes as in the conduction of gases, liquids, and other fluent materials. In a more particular sense, the invention is directed to the making of pipe which in at least certain essential structural characteristics is non-metallic and derives its integrity in substantial measure by the structural incorporation of synthetic plastic material or the like, herein conveniently identified as resin. Thus a specific feature of the invention is the manufacture of pipe of essentially non-metallic resin-bound structure, capable of use under pressure as well as less severe conditions.

A chief object of the invention is to provide for the manufacture of pipe of the character described, by rapid and economical procedure, involving relatively simple elements such as sheet or strip materials together with curable resin material. A further object is to provide, by such manufacturing procedure, for the production of pipe of rugged, durable structure, highly impervious and indeed preferably capable of resisting high fluid pressures and likewise mechanical strains, impacts and other forces.

Another, specific object is to provide pipe making procedure specially adapted for practice under emergency or field conditions, e. g. with a minimum of equipment and with materials which may be transported, stored and dispensed in an unusually convenient manner. Thus one useful application of the invention is in military or naval operations, e. g. so that pipe can be rapidly manufactured and laid or otherwise installed under field conditions and by relatively unskilled personnel. Similar applications of the invention involve other situations where pipe must be manufactured or may be more conveniently manufactured at the locality of its use. It is presently contemplated that under most circumstances, transportation, storage and handling of the materials employed in the present process are far more convenient and economical than where prefabricated pipe, as of the usual metallic character, would otherwise have to be employed.

Still further objects are to provide specific improvement in the manufacture of pipe of the stated nature, especially non-metallic pipe having unusual properties of chemical or other resistance, and to provide for the rapid, economical and if desired advantageously continuous production of such pipe. Another object is to afford improved pipe structure of the character stated, having unusual properties of durability, strength, pressure resistance, lightness of weight and adaptability to a wide variety of uses.

An additional object is to provide improved and economical procedure for joining or uniting lengths of pipe, especially pipe made in accordance with the present invention, another object being to provide novel and efficient pipe joints of the nature stated.

To these and other ends, preferred procedure according to the invention involves the provision first of a tubular supporting structure, as by wrapping sheet material, preferably of a stiffly flexible character, into a desired tubular shape about a mandrel, the thus formed shape or support advantageously including at least substantial overlap of the sheet material. It is greatly preferred to use an impermeable sheet material. While a pipe satisfactory for most purposes can be fabricated by using one and one-half turns of sheet material around the mandrel, the strength of the pipe, especially with respect to its resistance to internal pressures, is very greatly increased by using two full turns of sheet material plus an overlap of at least one inch or one-eighth of a turn, whichever is less. A second step of the method then advantageously involves a wrapping of fabric, e. g. fabric tape, around the tubular support, the fabric wrapping having considerable overlap at least with respect to successive turns or as constituted by outwardly successive layers of helical servings. A special feature of the invention is the complete impregnation of the fabric wrapping with curable resin material, such impregnation being preferably effected, with unusual advantage, by treating the tape with the curable resin in liquid or semi-liquid form just before it is applied to the tubular support. The resin material is in any case so used and cured that it flows into firm, preferably adherent contact with the described support.

The completed, cured product of the invention thus represents a solid, rugged pipe structure wherein the fabric wrapping is essentially embedded in a body of resin material which not only constitutes the wrapping as a solidified covering but effectively unites the wrapping with the underlying support in a well bonded and indeed effectively integrated body free from cracks, cavities, pin holes or other imperfections. As will be explained, special convenience is achieved by the utilization of self-curing resin, e. g. of the type which within a short time after final compounding and impregnation in the fabric, say within hours, cures exothermically to a solid, tough, adherent mass. Although in some cases resins requiring external heat for curing, or even other special conditions, may be used, it is greatly preferred for simplicity of manufacturing operation to avoid materials requiring pressure (as in molding equipment), one particular advantage of the invention being that effective results can be obtained without molds, dies or other pressure-type apparatus for shaping or setting the resin utilized as a major element of the body-forming structure.

By way of example and further, specific disclosure of the invention, certain useful embodiments of the procedure and of completed pipes are shown in the accompanying drawings wherein:

Fig. 1 is a perspective view illustrating in a chiefly diagrammatic manner, one simple but effective process of pipe manufacture according to the invention;

Fig. 2 is a longitudinal section of the completed pipe structure, again somewhat diagrammatic for clarity of illustration, Fig. 2 also showing the mandrel in the course of removal;

Fig. 3 is a transverse section of the completed pipe, taken as on line 3—3 of Fig. 2;

Fig. 4 is a diagrammatic perspective view, showing another mode of pipe manufacture pursuant to the invention;

Fig. 5 is a somewhat diagrammatic view showing an initial stage of pipe joining procedure, i. e. for effecting joint of successive lengths of pipe;

Fig. 6 is a view similar to Fig. 5 showing a later stage in the pipe-joining process;

Fig. 7 is a longitudinal sectional view showing two pipes of the present character, united by a joint in accordance with Figs. 5 and 6.

Fig. 8 is a plan view, with the cover removed, of a tape impregnating and dispensing device illustrated in Fig. 5;

Fig. 9 is a transverse section of the device of Fig. 8, including the cover, such section being taken on line 9—9 of Fig. 8;

Figure 10:
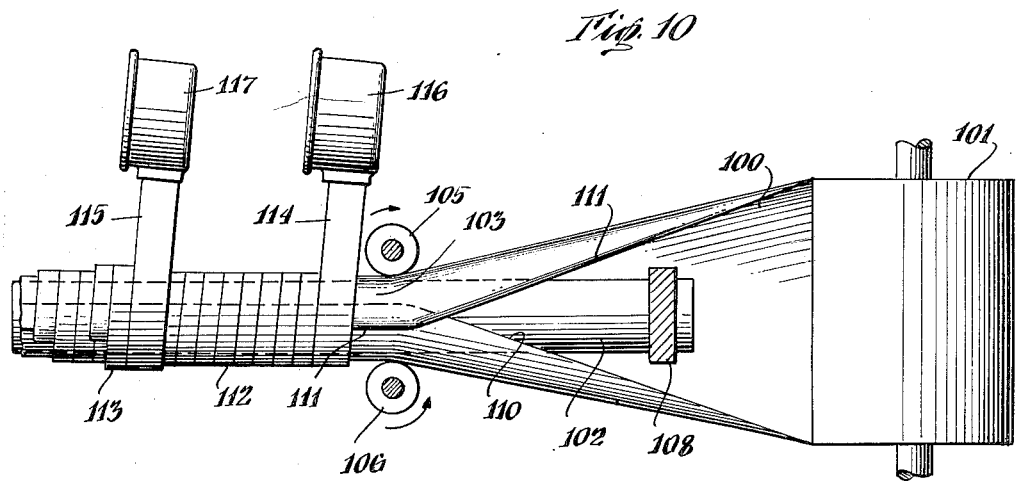
Fig. 10 is a plan view, chiefly diagrammatic, of another modification of the pipe manufacturing process.

Referring now to Fig. 1, the pipe making procedure there shown involves the utilization of a suitable mandrel 20 having dimensions which correspond to a length of pipe to be manufactured and include a diameter equal to the desired internal pipe diameter, it being here noted that although the various procedures of the invention are basically adapted for making pipe (i. e. tubular articles) of practically any diameter, the invention is unusually advantageous and effective in making pipe of sizes conventional for conduction of liquids or gases in substantial quantity, e. g. pipe ranging from an internal diameter of say one inch, or perhaps less, to eight or ten inches or more. The mandrel 20 may be of any desired material, e. g. metal, wood or other composition, and may be hollow or solid and have a round, oval or other curved or uncurved section. By way of example, a simple cylindrical mandrel is shown, as used for making pipe of the conventional, generally cylindrical shape, a desirable feature of the mandrel being that it have a relatively smooth and indeed preferably polished (or perhaps lubricated) surface, to facilitate its subsequent removal.

Around the mandrel 20 there is first wrapped a sheet of thin, stiff material, having sufficient flexibility for reasonably close conformity with the mandrel. The quality of the pipe is greatly improved if an impermeable material is used, i. e., one which is non-porous and free from cracks, small holes and other defects, and which does not absorb the fluid which is to be conveyed by the pipe. The sheet material is thus wrapped to constitute a tubular structure 22 which supports the subsequent tape wrapping and becomes an integral part of the completed pipe. While a great variety of materials may in a number of cases be employed, including various fabrics, preferably stiffened fabrics either of felted or woven structure, or indeed sometimes even thin metallic sheet, particularly effective material for the tubular support 22 is a glass fiber cloth or other durable fabric, impregnated, stiffened and preferably rendered highly impermeable by a resin material, it being understood that such sheet is thus manufactured and cured prior to its use in the present process. For optimum adherence, the resin impregnation of such sheet may be of the same type as that utilized in the subsequent covering, described below.

Where, as is preferably the case, the sheet material of the support 22 is relatively rigid, i. e. characterized by a rather stiff resiliency, temporary means such as strings 24 may be employed to hold the wrapping 22 in desired cylindrical shape around the mandrel pending application of the subsequent covering. It will be noted that the tubular support preferably involves considerable overlap of its sheet material, for example being constituted of at least one and one-half turns of such material around the mandrel (see Fig. 3). While one and one-half turns of material will produce a pipe which is suitable for many purposes, a considerable advantage in ability to withstand pressure is gained by using two full turns with substantial additional overlap (say one-eighth turn or one inch, whichever is less), and often advantageously three turns. Stiffness of the sheet structure 22 promotes effective application and setting of the covering described below, and also minimizes any tendency of the structure to bind or seize on the mandrel.

The support 22 may preferably be wrapped helically around the mandrel, with successive turns overlapping.

After the support 22 is provided, and preferably (although not always necessarily) while it remains on the mandrel 20, a wrapping 25 of fibrous tape 26 is applied to the outer surface of the tubular support. As explained above, the tape 26 is conveniently impregnated with a curable resin material in liquid or semi-liquid form before it is applied. Although other means of impregnating the tape 26 may be used, including an applicator device such as shown in Figs. 5, 8 and 9, Fig. 1 simply shows the tape 26 being drawn from a roll 27 and passed into and out of a tank 28 containing a body of the liquid, uncured resin 30. The amount of the resin material incorporated in and on the tape being controlled as desired to avoid waste yet to assure sufficient impregnation to serve the purposes herein described (such control being effected by appropriate means not shown), the tape is directly wrapped around the support 22, as by a helical, overlapping wrapping. Preferably in most cases a plurality of layers of such wrapping are utilized, e. g. at least two or three layers. The actual manipulation of applying the wrapping may be performed in any convenient manner, as by actually carrying the supply of impregnated tape around the mandrel-supported sheet structure 22, or conveniently (as indicated in Fig. 1) by turning the mandrel and its mounted support 22 about the longitudinal axis so that the tape is continuously drawn around the surface, with continual snugness. The helical wrapping, as explained, may continue throughout the length of the structure 22 and then may be repeated in the reverse direction over itself one or more times as desired.

Although the wrapping of tape is conveniently applied directly to the essentially entire bare surface of the tubular structure 22, the latter may, if desired, have some preliminary wrapping or treatment, as by preliminary coating of the uncured resin material, or as by a spaced winding of string or equivalent, compressible cord (for localizing pressure of the wrapped outer covering). The string-wrapped tube may be painted with curable resin to impregnate the string.

Another method of applying the tape is first to wet or coat the support 22, as by painting, with the curable resin material, then to wind the dry tape on the coated support, and apply another coating of the resin material over each layer of tape.

As indicated, the fabric material 26 is preferably cut or manufactured in the shape of a long tape and may be of a variety of fibrous materials, e. g. preferably fabrics of a highly flexible nature, a special requirement being that such fabric have high strength in the longitudinal direction of the tape. Glass fiber cloth is notably satisfactory, as well as other durable, woven or like fabrics having suitable inertness to the resin material, and resistance to the curing temperatures employed, if high. Another effective material for the outer wrapping is paper having impregnated in its parallel glass fibers, e. g. unidirectionally lengthwise of the tape. Thus one such material consists of paper tape having embedded in it a multiplicity of closely packed, parallel, unidirectional glass fibers, e. g. in amount of about 90 fibers to the transverse inch.

The resulting wound structure is diagrammatically illustrated in Fig. 2, it being understood that the resin impregnation is omitted for clarity and that the thickness of the several wrapping sheets 22, 26 is exaggerated in this and other views for better illustration. As will be seen, the helical wrapping completely encases the supporting tube 22. The resin material impregnated in the tape, is conveniently in such sufficient amount that excess flows into contact with the tubular support 22 throughout its outer surface and so that the entire mass of the covering 25 essentially represents glass cloth or other servings embedded in a body of the resin. In consequence as the resin becomes cured, this mass sets up to form a solidified, tough covering, preferably compressively engaging the outer surface of the support 22 and adhering thereto in an effectively bonded manner. Although in some cases the mandrel may be withdrawn at an earlier stage, a convenient practice is to remove it after curing is completed.

The final product then remaining is a finished pipe section having the elements described above and essentially unified, by the resin, into a rigid, coherent tubular body, highly impervious and of unusual strength and durability. If desired, the ends of the pipe section may be sawed off to provide plane end edges (e. g. as at 32 in Fig. 2) with the full body of both wrappings and of the resin extending squarely to such edge. However, in other cases, especially with the procedure indicated in Figs. 5 to 7, reasonably effective joints between successive pipe lengths may be provided without special treatment of the pipe ends, especially if the wrapping structure has been carried effectively up to such ends. In some cases, however, a short distance of the support may be kept clear of the outer wrapping near the ends, the ultimate joint then serving the function of the outer wrapping, as will become apparent in view of the subsequent description of Figs. 5, 6 and 7 hereinbelow.

While any one of a considerable variety of resin materials may be utilized, including resin mixtures which require heat or other treatment (very preferably without pressure) for curing to a solid, durable condition, some special advantage is attainable with so-called self-curing mixtures. Among such mixtures, so-called polyester resins may be mentioned as suitable, e. g. materials understood to be composed of maleic anhydride (or fumaric anhydride) poly-ol esters cross-linked with a vinyl monomer. Such materials may be mixed with a catalyst consisting of benzoyl peroxide and tricresyl phosphate, together with an accelerator such as cobalt naphthenate or cobalt linoleate to constitute a liquid mixture which will spontaneously set up and cure to a solid mass within a time determined by the nature, amounts and proportions of the catalyst and accelerator. For instance, successful results can be had with each of two polyester resins, both in liquid form, and respectively known as Marco MR-28 and Marco MR-29. A preferred mix may thus consist of 90% (by weight) of either of the resins just mentioned, with 5% each of the catalyst or curing agent, and the accelerator, such as described. The actual proportions of the substances in the resin mix are not necessarily critical, some variation being possible, especially to achieve variation in the speed of cure. Indeed with the formula last mentioned, cure rates from less than 30 minutes to longer times are easily achieved.

Other self-curing resins include melamine-aldehyde condensates, or urea-aldehyde condensates (appropriately mixed with maleic acid or phthalic acid to provide a self-curing mixture). Resins slowly self-curing at room temperature can also be used.

Other suitable resins include those of the so-called epichlorohydrin-bisphenol type. The resin material produced by reaction of epichlorohydrin with bisphenol has been found capable of yielding, in its ultimately cured state, a remarkably strong, durable and inert product, and it is known that such material can be cured with the aid of various acids (organic or inorganic) or certain alkalies (including one or another of various amines). The curing reaction of such resin with a curing agent may require a considerable time, and in some cases the application of heat from another source in order to achieve a properly complete cure. Further information about resin-forming materials of the epichlorohydrin-bisphenol type (to which the present invention is applicable) may be found in the literature including patents such as represented by Nos. 2,324,483 (July 20, 1943) and 2,444,333 (June 29, 1948) to Pierre Castan, and No. 2,575,558 (November 20, 1951) to Herbert A. Newey et al., wherein it is disclosed that curable reaction products, of the chemical type named above, may be made with equivalent reactants (including various bivalent or dihydric phenols), all as will be fully understood by those familiar with the art relating to this known resin-forming material. Such material, which may be here conveniently identified as epichlorohydrin-bisphenol reaction product, has been commercially available for some time, one such product (particularly suitable for present purposes) being known as Araldite.

While a curing time of less than an hour for a self-curing resin was mentioned above by way of example, in many instances a longer curing time is acceptable or even desirable. For instance, if a large quantity of pipe is to be made from one batch of resin, it will be desirable to use a resin which will remain uncured in the tank 28 for a period long enough to complete the manufacture of the desired quantity of pipe. A slower self-curing resin may then be used or alternatively a resin requiring heat to complete the cure. Slow self-curing resins permitting so-called "pot times" up to two hours are entirely practical. The epichlorohydrin-bisphenol resins are suitable for this purpose.

The final resin mixture, of all ingredients, is thus deposited at 30 in the tank 28, and by such or other means is suitably applied in abundant quantity to the tape 26. An extremely strong body results when this material cures and solidifies, a further feature being strong adherence or bonding of the resin to other materials, including other resin-impregnated substances as well as various non-metallic (or metallic) surfaces, all to the effect of a rugged, unified article. Thus Fig. 3 shows a cross-section of the completed pipe, illustrating the manner in which the fabric impregnated outer wrapping 25 is essentially converted to a solidified, reinforced resin body, in close surrounding and sealing adherence to the tubular support 22.

It will be understood, of course, that self-curing resin materials are specially advantageous for manufacture of pipe in the field or under emergency conditions, as where supplemental heating or other equipment is not available. As will now be seen, the process is essentially simple, requiring no extraordinary skill and yet providing an eminently satisfactory pipe product, capable of transporting gases or liquids even under many hundred pounds of pressure per square inch. The simplicity and convenience of the procedure lends itself to use under unusual conditions, with special regard for the fact that the sheet material and tape 26 may be easily transported. Furthermore, since a single mandrel can be used for making many lengths of pipe, the equipment is readily adapted for manufacture of pipes of a variety of diameters, the only requirement being to have one mandrel for each size.

In Fig. 4 a somewhat modified procedure is illustrated. Here the tubular support structure 42 is provided by a helical overlapping wrapping of sheet or strip material 43 on the mandrel 20, while successive layers of tape wrapping 44, 45 and 46 are helically applied outside the tubular support 42 by tapes 48, 50, 52 respectively brought from corresponding rolls 54, 56, 58, with impregnation of the tape in curable resin material. For simplicity of illustration, the rolls 54, 56, 58 are shown partly submerged in a body 60 of the resin material in a tank 61.

By way of example (although other means of manipulation may be used), Fig. 4 conveniently contemplates that the mandrel 20 shall be simultaneously rotated on its axis and advanced longitudinally, as in the direction of the arrows, for drawing about it in a helical manner the successive servings of the support-forming, stiffly flexible material 43 and the liquid-resin-impregnated tapes 48, 50, 52. It will be understood that appropriate supporting or guiding apparatus (not shown) may be employed for the various elements in Fig. 4, including the mandrel and the several rolls of material, such equipment embodying any appropriate form, such as may be known for wrapping strip material about elongated objects. By this specific procedure the pipe is essentially completed in wrapped condition as the mandrel traverses the various localities of wrapper feed, affording a structure essentially similar to that of Figs. 2 and 3 (except that the inner support is a spiral or helical wrapping), and so that upon curing of the resin material, an essentially identical pipe structure is provided with the various advantages explained above. Instead of advancing the mandrel 20 relative to the tapes 48, 50, 52 and the material 43, the latter elements may be mounted on a common support and advanced relative to the mandrel 20.

Figs. 5, 6 and 7 illustrate one way of joining successive pipes such as manufactured by procedure of Figs. 1 and 4. Although not always necessarily, it may here be assumed that the ends of the pipe lengths 70, 71 are sawed off square so as to afford a plane butt joint 72; by way of example, the pipe actually here shown is such as made in accordance with the process of Fig. 4 (see Fig. 7) including the internal helically wrapped support 42 and the outer resin-embedded tape wrapping 44—46. For making the joint, the ends of the pipe lengths are butted as described, and then an overlapping, helical wrapping of resin-impregnated tape is applied for a considerable distance, e. g. at least several inches from each side of the joining plane 72, i. e. so as to provide a wrapping which covers the seam 72 and extends over a substantial part of both pipe surfaces. This tape wrapping may be identical with wrapping used for making the pipe as explained above, including glass fabric or other tape impregnated with curable and very preferably self-curing resin material. In Fig. 5 the tape is illustrated as dispensed from an impregnating applicator device 74 as more particularly described below.

Over a single layer wrapping 73 of the wet impregnated tape, there is then disposed a cover of sheet material 76, which may be a stiff, somewhat flexible sheet, such as utilized for the tubular support 22 or 42 in the pipe itself. Thus conveniently one or one and a half or more turns of this rigid, slightly flexible covering is wound around the wrapping 73, preferably covering at least most of it. Then finally one or advantageously several layers of additional wet, curable resin-impregnated tape 78 (means for impregnation being omitted for clarity in Fig. 6) are wound around the covering 76 and also around some further adjacent portions of both pipe surfaces, affording a complete covering enclosure for the assembly 73—76. This assembly, including abundant impregnation of the liquid, self-curing resin mixture, then cures to a hard coherent mass, firmly compressed around and adhering to the outer surfaces of the pipes. A reinforced solid structure results constituting an integral coupling or union for the pipe ends, as clearly illustrated in Fig. 7. Although in some cases certain portions of the several wrappings in the described union may be omitted, e. g. the inner wrap 73, the complete assembly including all wrappings is particularly effective for best strength and security of the connection.

As in the case of the pipe forming method, an alternative method of joining adjacent pipe ends is to first coat the ends of the pipe with uncured resinous material, and then apply the tape and sheet material wrappings dry, coating each layer of wrapping material with uncured resinous material after it is applied.

Figs. 8 and 9 show a convenient applicator device, which includes a supply of glass cloth or other tape and likewise of liquid resin material for impregnation in such tape, so arranged as to dispense tape for wrapping operations, either manually, or by appropriate mechanism (not shown) for holding and moving the applicator in such procedures as in Figs. 1, 3, 5 and 6. The device of Figs. 8 and 9 comprises a cup-shaped cylindrical vessel 80 (e. g. of metal) having a flat bottom 81 and a central pin or stud 82 for rotatably supporting a roll 83 of the fabric tape, indicated by dotted line 84 in Fig. 8. A plurality of guide pins are mounted on the bottom 81 internally of the cup, to guide the tape 84 through a path which passes close to the inner surface of the cup 80, preferably at several localities. Thus for example, four such guide pins 85, 86, 87 and 88 are shown equally spaced around the inside of the cup, the tape 84 passing around the outer smooth surfaces of the pins 85, 86 and 87 and then around the inner face of the pin 88 for withdrawal through a metering slot 90 in a wall of the cup 80. By this means, the roll 83 of tape is held in a substantially stationary position, while the path followed by the tape insures that it will be submerged in liquid in the cup, at least at one place or another, despite the position in which the cup may be held.

A tight fitting cover 91 having an upturned flange 92 is frictionally seated within the open end of the cup, to close the container. As indicated above, the container is filled or partly filled with the liquid resin material, so that as the tape 84 is withdrawn it is necessarily fully impregnated, the amount or excess amount being reduced or controlled by the metering slot 90. It will now be appreciated that this device affords a convenient way of dispensing liquid uncured resin-impregnated tape for wrapping operations as contemplated herein, especially where such operation requires manually or mechanically carrying the tape supply around and around the pipe support 22 or 42 or the completed pipe structures as indicated at 70 and 71 of Fig. 5.

Figure 11:
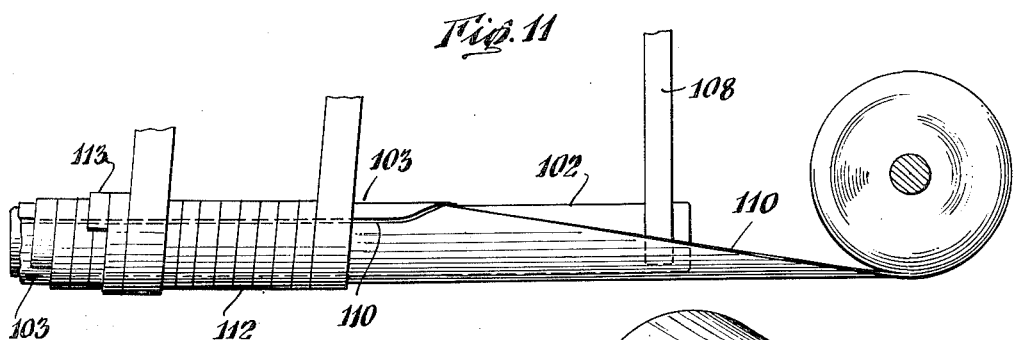
Fig. 11 is a side elevational view showing the procedure of Fig. 10.
Figure 12:
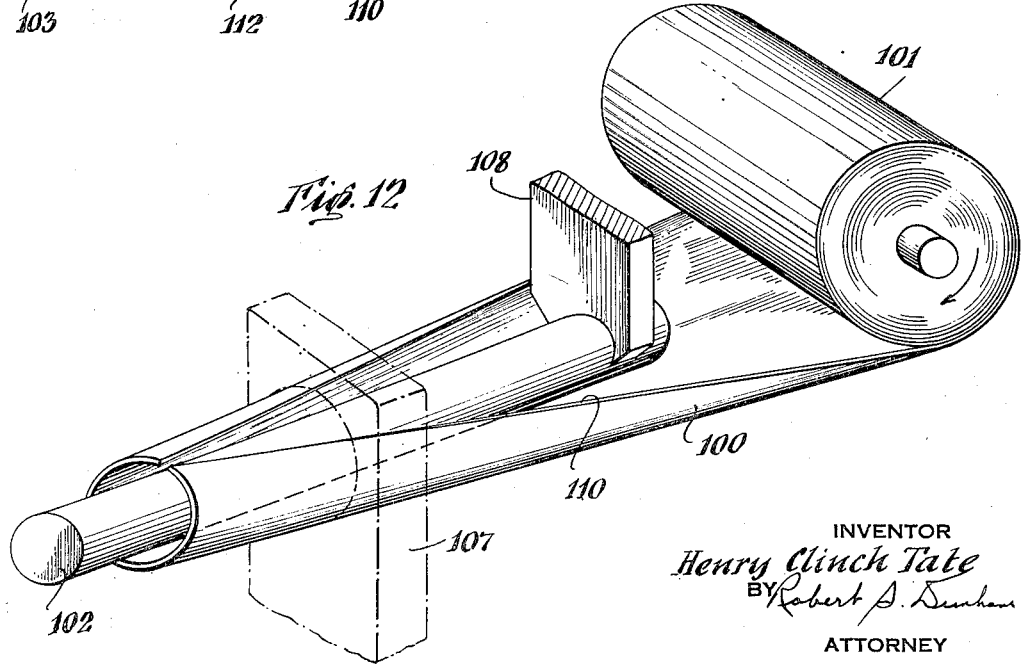
Fig. 12 is an enlarged detail, diagrammatic view of an initial stage of the procedure of Figs. 10 and 11.

Figs. 10, 11 and 12 show another embodiment of the improved procedure for making pipe, here of an essentially continuous and if desired, automatic character. The thin, stiffly flexible sheet material 100 which provides the tubular former or support is drawn from a supply roll 101 and subjected to a curling or bending action transversely as it passes onto and along a stationary mandrel 102, so as to be wrapped around the mandrel in a corresponding tubular shape as apparent at 103 in Figs. 10 and 11. Apparatus for continuous lengthwise formation of tubular shapes from a web of sheet material by progressively curling or bending the sheet material in a transverse direction while advancing it longitudinally, is known for various purposes and is consequently not illustrated in detail herein, it being understood that suitable means such as dies, guides or rollers, are employed for effectuating the desired deformation of the sheet 100 and likewise means for continuously advancing the formed tubular shape endwise so as to discharge it as desired and simultaneously to draw the sheet material from its supply. Simply by way of illustrative indication, Fig. 10 shows a pair of rollers 105, 106 which may be suitably faced with material to engage the outer surface of the sheet 100 frictionally and draw the latter, i. e. at its locality of incipient tube formation, off the supply roll and to advance the tube longitudinally along the smooth cylindrical mandrel 102. Similarly for illustration, a circularly apertured die 107 is illustrated in dotted lines in the enlarged view of Fig. 12, to indicate one of a plurality of guiding or like means whereby the desired shape may be imparted to the traveling web. As explained, the mandrel 102 is stationary, supported at one end by an arm 108.

Thus a continuous tubular support is formed around the mandrel 102, the edges 110, 111 of the sheet being overlapped to any desired degree. Although only a small overlap is shown in the drawings, it will be understood that a mutual overlap of at least one-half the mandrel circumference is preferably achieved. As the tubular support thus slides along the mandrel, successive wrappings 112, 113, of curable resin-impregnated tape may be applied, i. e. as many superimposed layers as desired. For such purpose the individual tapes 114, 115 for the succeeding layers may be dispensed from suitable means such as applicators of the type illustrated in Figs. 5, 8 and 9, the applicators being here designated 116, 117. The applicators are continuously revolved about the tube 103; while such application of the wet impregnated fabric tape can be effected manually, it will be understood that mechanical means are preferably employed, and may have a conventional structure (as in devices for wrapping insulating or protective servings around cables) so that they need not be here illustrated.

The procedure of Figs. 10, 11 and 12 yields a continuously discharged pipe of the character of that produced by the other methods herein, specifically that of Fig. 1, and on curing and solidification of the resin, constitutes a complete pipe having the advantages of rigidity, strength and structural integrity as explained above. Indeed it may be taken that Figs. 2 and 3 essentially illustrate the pipe product of the method of Fig. 10. As discharged from the continuous process the pipe may be cut or sawed off into appropriate lengths. The procedure of Fig. 10 is thus very rapid, and although it may require somewhat more equipment than the method of Fig. 1, it nevertheless takes full advantage of the simplicity of form of the materials used and their ease of manipulation and application.

The pipe products of the invention are unusually serviceable and durable, and adapted for permanent as well as temporary or emergency uses. One specific utility is in cases where resistance to chemical corrosion or to other influences that deteriorate metallic pipe, is a requisite. The structure is of unusually high strength circumferentially by reason of the wrappings of the fabric or other tape which are of high tensile strength in their lengthwise direction, while strength of the pipe in a longitudinal sense is constituted by the underlying supports or formers 22, 42 and 103, in cooperation with the bonded or compressively engaged resin mass which in turn is reinforced by the fabric wrapping. By virtue of the nature of the wrappings 25, 44, 114 and others as composed of resin-impregnated fabric, preferably glass fiber cloth or paper carrying longitudinal glass fiber threads or similar materials, a true impregnation of the wrapping is had. Thus a thoroughly continuous mass of resin is in effect created, free of pin holes or cracks, while the overlapping nature of the wrapping (in one or more respects) further obviates any minute transverse passages. Finally, although the inner tubular support may sometimes be of screen or less than wholly impervious material, a special advantage is achieved by utilizing an impermeable sheet (as described) for optimum attainment of leak-proof and pressure-tight conditions. The pipe of the invention may be of practically any size and cross-sectional shape; whereas the fabric used for wrapping around the impermeable support has been described above as tape, such tape may in fact be relatively wide fabric in some cases, especially in making pipe of very large diameter.

As also explained, the invention extends to novel and effective joints for pipe of this and other kinds, it being further appreciated that whereas joints between pipe ends of the same dimensions are illustrated and described above, the flexible nature of the various wrappings or servings makes it possible to use joints of similar type between pipes of different diameter.

It is to be understood that the invention is not limited to the specific operations and products herein shown and described, but may be carried out in other ways without departure from its spirit.

I claim:

1. A method of making pipe, comprising wrapping elongated, stiff, resilient, fibrous sheet material transversely of its long dimension around a mandrel at least one and one-half times to form a tubular base, said sheet material consisting essentially of woven glass fiber cloth impregnated with a curable resin material and cured, applying a multiplicity of overlapping turns of woven glass fiber tape generally helically around said tubular base to enclose the outer surface thereof, impregnating said turns of woven glass fiber fabric tape with curable resin material in its uncured state, and curing the resin material in the turns of fabric tape while said turns are held in firm engagement with the base to establish said multiplicity of turns as a solid, impervious covering in firmly bonded engagement with the base.

2. The method of claim 1, including the step of impregnating said tape with curable resin just before applying the turns of tape around the tubular base.

3. The method of claim 1, in which said curable resin material is self-curing.

4. A pipe comprising an inner tubular layer of at least one and one-half turns of a stiffly flexible, impervious sheet material consisting essentially of woven glass fiber cloth impregnated with a resin material and cured, and a substantially helical wrapping encircling said inner tubular layer, said wrapping consisting essentially of a multiplicity of turns of woven glass fiber tape impregnated with said resin material and cured while in contact with said inner layer, said wrapping constituting a substantially solid, impervious covering in permanent bonded engagement with the outer surface of said tubular layer.

References Cited in the file of this patent

UNITED STATES PATENTS

| | | |
|---|---|---|
| 1,229,175 | Christopherson | June 5, 1917 |
| 1,656,258 | Yale | Jan. 17, 1928 |
| 2,181,035 | White | Nov. 21, 1939 |
| 2,296,781 | Farny | Sept. 22, 1942 |
| 2,402,038 | Goldman et al. | June 11, 1946 |
| 2,536,243 | Walker et al. | Jan. 2, 1951 |
| 2,552,599 | Stout | May 15, 1951 |
| 2,561,781 | Bruce | July 24, 1951 |
| 2,596,184 | Sutton | May 13, 1952 |
| 2,606,574 | Lefebvre | Aug. 12, 1952 |
| 2,615,491 | Harris et al. | Oct. 28, 1952 |